United States Patent [19]

Hilpert et al.

[11] Patent Number: 4,647,003
[45] Date of Patent: Mar. 3, 1987

[54] REMOTE CONTROL ACTUATING DEVICE FOR A VALVE

[75] Inventors: Bruno Hilpert, Diessenhofen; Bruno Hunziker, Schaffhausen, both of Switzerland

[73] Assignee: Georg Fischer Aktiengesellschaft, Schaffhausen, Switzerland

[21] Appl. No.: 643,805

[22] Filed: Aug. 23, 1984

[30] Foreign Application Priority Data

Aug. 25, 1983 [CH] Switzerland ............... 4631/83

[51] Int. Cl.⁴ .................................. F16K 31/143
[52] U.S. Cl. .................................. 251/14; 251/58; 251/62; 251/89; 251/229; 251/250; 251/292; 92/5 R; 92/69 R; 92/136; 137/554; 137/556.3
[58] Field of Search .............. 251/14, 58, 62, 63.4, 251/89, 250, 101, 229, 107, 313, 130, 292; 92/59, 128, 136, 133, 5 R, 69; 137/554, 556.3; 116/277

[56] References Cited

U.S. PATENT DOCUMENTS

| | | | |
|---|---|---|---|
| 1,341,319 | 5/1920 | Hodges | 251/250 X |
| 2,324,571 | 7/1943 | Fitz | 251/130 X |
| 3,104,592 | 9/1963 | Sheesley | 251/58 X |
| 3,204,484 | 9/1965 | Gustafson | 251/130 X |
| 3,332,660 | 7/1967 | Slawinski et al. | 251/62 X |
| 3,338,140 | 8/1967 | Sheesley | 251/58 X |
| 3,388,682 | 6/1968 | Whiting | 92/5 R |
| 3,417,637 | 12/1968 | Vanderbilt | 251/130 X |
| 3,452,961 | 7/1969 | Forsman | 251/58 X |
| 3,460,799 | 8/1969 | Sanctuary | 251/58 X |
| 3,687,415 | 8/1972 | Turkot | 251/130 X |
| 4,087,074 | 5/1978 | Massey et al. | 251/58 |
| 4,094,231 | 6/1978 | Carr | 251/58 X |
| 4,260,128 | 4/1981 | Tito | 251/58 |
| 4,487,111 | 12/1984 | Prince | 92/138 X |

FOREIGN PATENT DOCUMENTS 2077355 12/1981 United Kingdom ............... 92/136

*Primary Examiner*—Larry Jones
*Assistant Examiner*—Carl D. Price
*Attorney, Agent, or Firm*—Toren, McGeady and Goldberg

[57] ABSTRACT

An actuating device operated by a pressure medium, such as compressed air, acting within a housing, can be secured to a valve by a mounting member attached to the valve. The actuating device includes a first piston guided in a cylinder part positioned on one side of the center part of the housing. A toothed rack is attached to the first piston and is in meshed engagement with a pinion shaft located within the center part of the housing. The pinion shaft is connected by a coupling part to the valve shaft. The same actuating device can be used for a larger valve by placing a second piston in another cylinder part on the opposite side of the center part from the first piston with a toothed rack attached to the second piston and in meshed engagement with the pinion shaft. The first and second pistons act in opposite directions and double the torque acting on the pinion shaft as compared to the torque delivered by the first piston.

8 Claims, 6 Drawing Figures

REMOTE CONTROL ACTUATING DEVICE FOR A VALVE

SUMMARY OF THE INVENTION

The present invention is directed to a remote control actuating device for operating a valve and includes a housing with at least one piston displacebly positioned in the housing and being actuable by a pressure medium. A toothed rack is connected to the piston and is in meshed engagement with a pinion shaft located in the housing. The pinion shaft is arranged to operatively engage the valve. A mounting member is secured on the valve and forms a base for the housing of the actuating device.

A known arrangement of this type is disclosed in the German Offenlegungsschrift No. 27 33 195 and uses a piston for actuating the valve which is a ball cock. A pressure medium can be used for acting on both sides of the piston.

In normal operating conditions, such as in a compressed air system, a determined operating torque is produced by a given piston size whereby the actuating device cannot be practically employed with the minimum possible operating costs for different valve sizes with various flowthrough cross-sections. Further, in power driven valve actuation devices utilizing two pistons working in opposite directions, as disclosed in the German Offenlegungsschrift No. 27 33 196, it is not possible to adapt the operating torque to different valve sizes operating at the same pressure.

Accordingly, either different sizes of the actuating device are required for different sizes of valves or the actuating device must be overdimensioned when used on smaller valve sizes with the result that operating costs are higher than usual.

Therefore, it is the primary object of the present invention to provide an actuating device for a valve which can be adapted to operating valves with different nominal sizes using only one size of piston and by utilizing other simple means.

In accordance with the present invention, the housing for the actuating device is of a modular construction. The housing includes a symmetrical center part with a first axis and a second axis extending transversely of the first axis. The pinion shaft is located within the center part and is coaxial with the first axis while at least one piston is arranged within the cylinder part of the housing and is displaceable in the direction of the second axis. Depending on the valve to be operated, the actuating device may include one piston or two pistons each operating in the opposite direction and in meshed engagement with the pinion shaft.

The one or two pistons can be arranged so that the pressure medium acts on one or both sides of the piston. If the pressure medium acts only on one side, springs can be used in combination with the pistons for biasing the pistons in the direction opposite to the direction in which the pressure medium operates.

By the simple conversion of the actuating device from one piston to two pistons working in opposite directions, the operating torque can be doubled substantially increasing the use of the actuating device in a practical manner.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
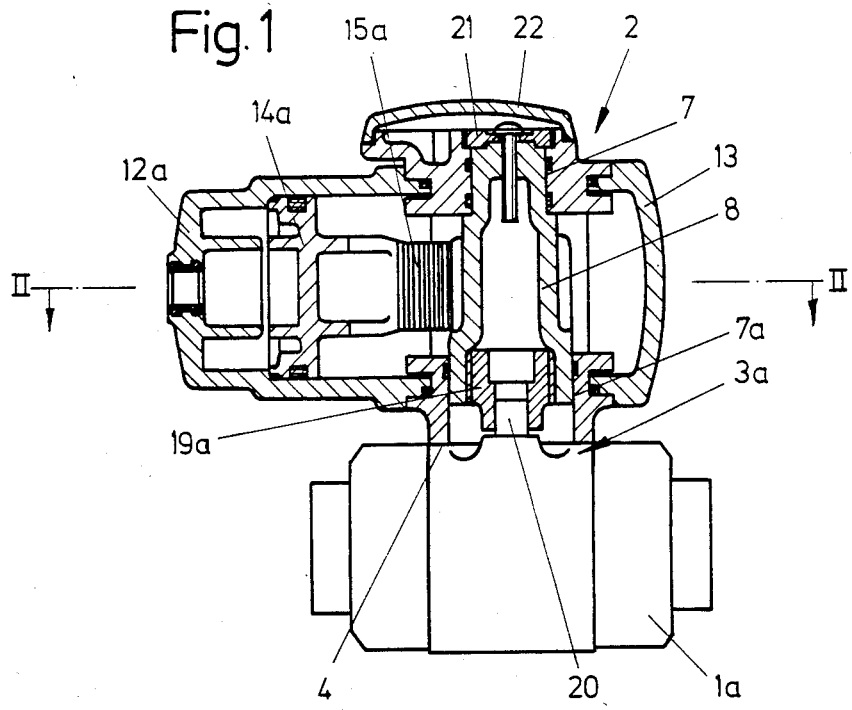
FIG. 1 illustrates an actuating device embodying the present invention shown in longitudinal section and arranged for operating a valve.

In FIG. 1 a valve $1a$ is shown on which a remote control actuating device 2 is positioned. A mounting member $3a$ is engaged on the valve $1a$ by clamping connections, note FIG. 6, and it includes a base 4 for mounting the actuating device 2 on the valve. Actuating device 2 has a housing 5 with a symmetrically arranged center part 6. The center part as viewed in FIG. 1, has an upwardly extending first axis and a second axis extending transversely of the first axis. Two bearing holes 7, $7a$ are located in the center part 6 encircling the first axis . and spaced apart in the center part as viewed in FIG. 1. A pinion shaft 8 is coaxial with the first axis and is rotatably mounted in the two bearing holes or openings 7, $7a$. Another through-opening or hole 9 is provided through the center part 6 circling the second axis so that the hole 9 extends transversely of the pinion shaft 8. In the center part 6 on the opposite sides of the first axis and encircling the second axis are centering holes 10 with fastening or attachment surfaces 11 each arranged to provide a coaxial attachment, such as by means of screws, of a cylinder part $12a$ on one side of the center part and a housing cover 13 on the opposite side. Accordingly, the cylinder part $12a$ is located at one end of the through opening 9 while the housing cover 13 is located at the opposite end. Due to the symmetrical construction of the center part 6, the cylinder part $12a$ can be attached on either the left hand or right hand side of the center part as viewed in FIG. 1 or, in place of using a housing cover 13, cylinder parts can be provided on both sides of the center part, note FIGS. 3 and 4.

Piston $14a$ to which a toothed rack 15 is connected, is positioned within the cylinder part $12a$ and is guided for displacement of the second axis through the hole 9. A pressure medium can act on both sides of the piston $14a$, preferably compressed air is used as the pressure medium, so that the piston is displaceable between two end positions, note FIGS. 1 and 2. The pressure medium is supplied via lines, not shown, leading to a connection 18 at the end of the cylinder part $12a$ spaced outwardly from the center part 6.

Figure 3:
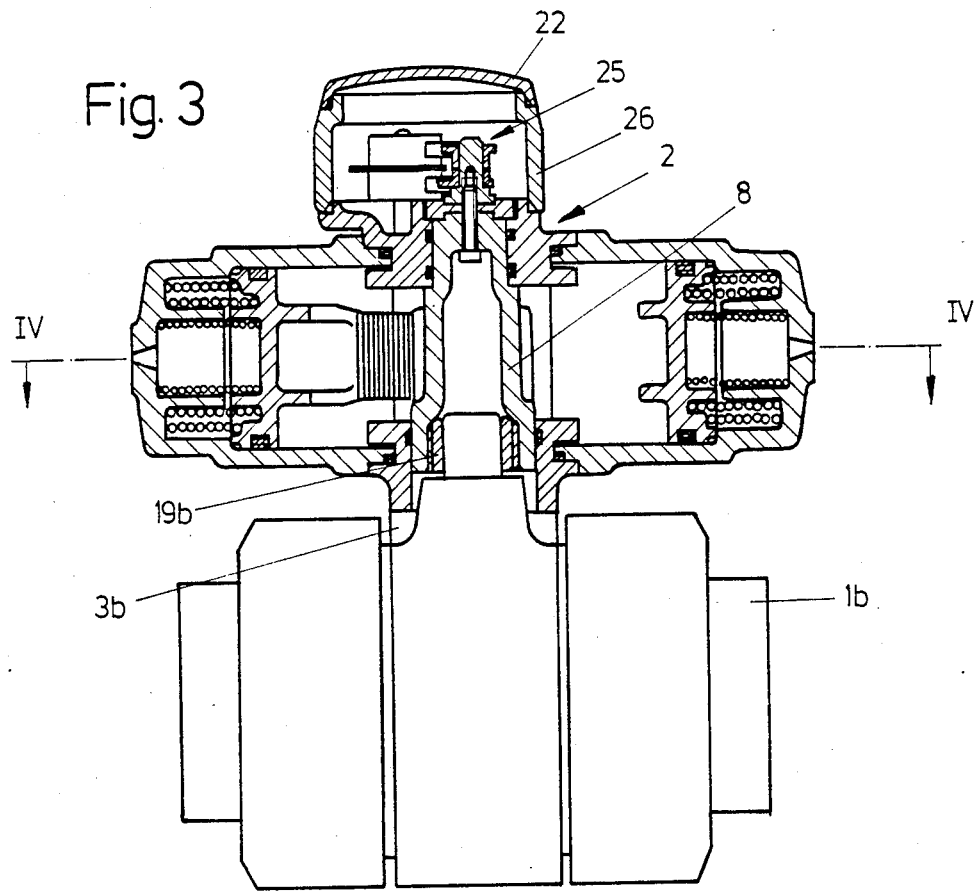
FIG. 3 is a view similar to FIG. 1 with the actuating device operating a larger valve.

The pinion shaft 8 is connected to a coupling part $19a$ so that the shaft and the part rotate as a unit. The pinion shaft 8 can be joined to the coupling part 19a by a plug connection. The coupling part 19a is secured to the shaft 20 of the valve 1a so that it can operate the valve. To mount the actuating device 2 on valves which are different in size and shape, only the coupling parts 19a of FIG. 1 and 19b of FIG. 3 and the mounting members 3a of FIG. 1 and 3b of FIG. 3 are correspondingly sized relative to the valve. A valve position indicator 21, visible through a transparent cover 22, is located on the upper end of the pinion shaft 8. While the main body of the center part 6 is symmetrical relative to the first axis, the support for the cover 22 is not symmetrically arranged.

Figure 2:
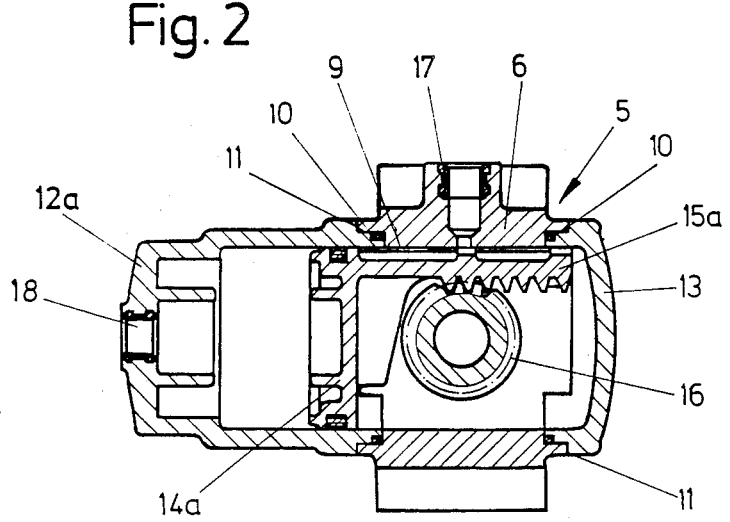
FIG. 2 is a sectional view taken along the line II—II in FIG. 1.
Figure 4:
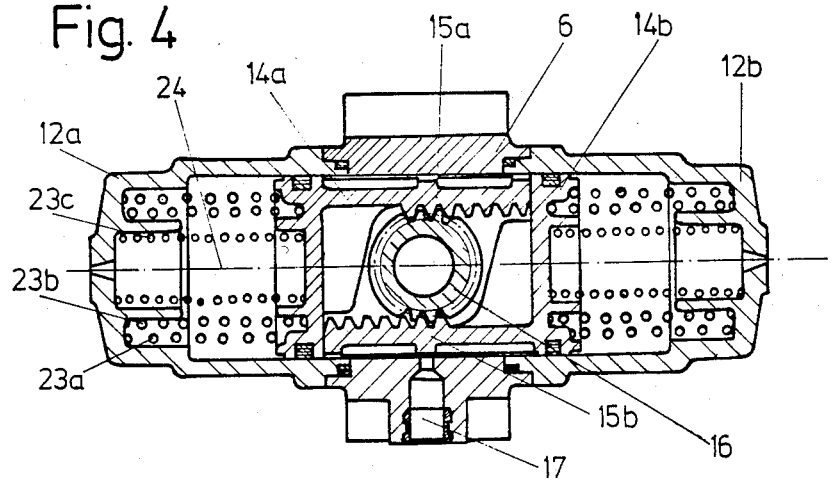
FIG. 4 is sectional view taken along the line IV—IV in FIG. 3.

In FIGS. 3 and 4 another valve 1b is shown of larger size and with greater throughflow cross-section than in FIGS. 1 and 2. In this embodiment, the actuating device 2 has an increased operating torque. The same components are used as in the embodiment in FIGS. 1 and 2, however, instead of a single piston 14a, two pistons 14a, 14b are positioned within the housing each displaceable in the opposite direction relative to the other. Since two pistons are used, each piston has a cylinder part 12a, 12b of the housing with each cylinder part screwed into an opposite side of the center part 6. As a result, the housing cover 13 in FIGS. 1 and 2 is replaced by the cylinder part 12b in FIGS. 3 and 4.

In addition, FIGS. 3 and 4 show another feature of the present invention involving the use of springs cooperating with the pistons 12a, 12b for producing the closing or opening movement of the valve.

As can be seen in FIGS. 3 and 4, a total of three springs 23a, 23b and 23c are positioned between the piston and the closed end wall of the cylinder 12a, 12b so that different operating torques and/or spring characteristics can be produced.

The pressure medium for use with the pistons 14a, 14b is supplied through a connection 17 in the center part 6 so that the medium acts on the ends of the pistons facing one another whereby the pressure medium displaces the two pistons away from one another simultaneously acting against the biasing action of the springs. As the pistons are moved outwardly away from the center part 6, the racks 15a, 15b in engagement with the pinion 16 on the shaft 8, note FIG. 4, rotates the pinion shaft counterclockwise in affording the open-closed movement of the valve. If the movement is reversed, the two pistons 14a, 14b can be turned 180° around the second or longitudinal axis 24, thereby reversing the rotational direction of the pinion shaft. For this purpose, the pinion 16 has a number of teeth divisible by four.

In the embodiment illustrated in FIG. 3, the actuating device has a valve position indicator 25 which generates electrical signals. The indicator 25 is located within a housing 26 mounted on the center part 6 and it is covered with a transparent cover 22.

Figure 5:
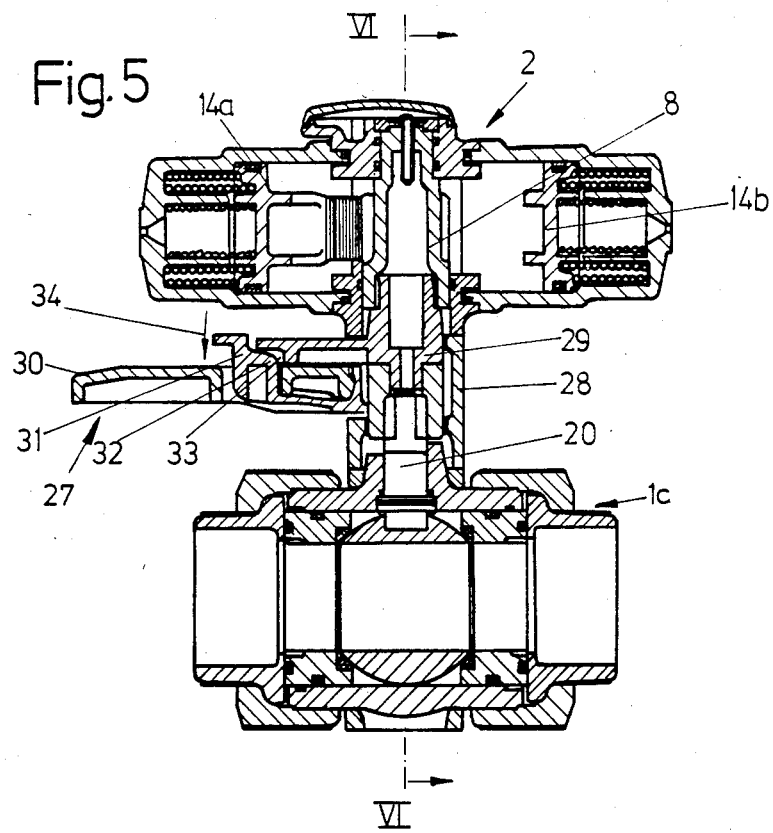
FIG. 5 is a longitudinal sectional view, similar to FIGS. 1 and 3 with an actuating device of the type shown in FIGS. 3 and 4 operating a ball cock.
Figure 6:
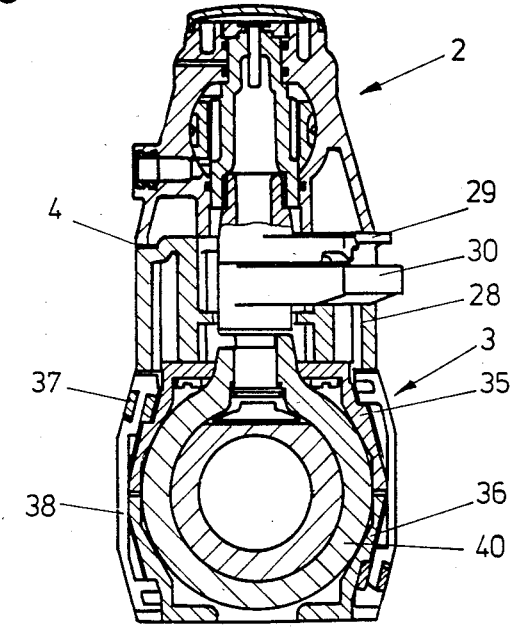
FIG. 6 is a sectional view taken along the line VI—VI in FIG. 5.

Still another embodiment of the present invention is illustrated in FIGS. 5 and 6 and includes a hand-actuating device 27 located between the valve 1c which is a ball cock, and the actuating device 2. An intermediate piece 28 is attached to the mounting member 3 and forms the base 4 for securing the remote control actuating device 2 to the mounting member. A lever 29 is located on the pinion shaft 8 so that it rotates with the shaft and a hand lever 30 is mounted on the valve shaft 20 so that it rotates with the shaft. A resilient pawl 31 is fastened on the hand lever 30. Pawl 31 has a projection 32 which engages in a recess 33 in the lever 29. The combination of the projection 32 and the recess 33 form a connection between the pinion shaft 8 and the valve shaft 20 so that the valve shaft can be operated by the pinion shaft when the actuating device is operated.

If it is desired to operate the valve 1c by hand, the projection 32 is moved manually out of the recess 33 by pressing downwardly on the pawl in the direction of the arrow 34 so that the connection between the pinion 8 and the shaft 20 is interrupted and the shaft 20 can be turned about the first axis, that is the axis of the pinion shaft, but without rotating the pinion shaft and displacing the pistons 14a, 14b.

As can be seen in FIG. 6, the mounting member 3 is made up of two parts, an upper part 35 and a lower part 36 which are clamped against the housing 39 of the valve by wedge connecting parts 37, 38. Such an arrangement affords a rapid exchange of the actuating device 2.

The actuating device can be employed with different valve sizes and types utilizing the same parts by providing different assemblies of such parts. The following different embodiments, which can be combined, are possible:

with one or two pistons and the corresponding cylinder parts;

with a spring biasing action on one side of the pistons or with the pressure medium acting on both sides of the pistons;

with or without the hand-actuating device;

with a direct position indicator or with a position indicator generating electrical signals; and with the possibility of reversing the application of torque to the valve shaft by reversing the assembly of the pistons.

All of the parts of the actuating device, with the exception of the screws and springs, can be produced advantageously from plastics material in an injection molding process without or with very limited mechanical processing.

With the modular type construction of the present invention permitting the use of identical parts, low form costs and storage costs are possible.

The actuating device can be used with all types of valves, preferably two-way valves and cocks, such as ball cocks, conical cocks, throttle valves and the like, can be used.

While specific embodiments of the invention have been shown and described in detail to illustrate the application of the inventive principles, it will be understood that the invention may be embodied otherwise without departing from such principles.

We claim:

1. An actuating device for the remote operation of a valve, said actuating device comprising a device housing, at least one piston displaceably positioned within said device housing and being actuatable by a pressure medium for displacement in a first direction, a toothed rack connected to said piston for displacement therewith, a pinion shaft including a pinion located within said device housing and with said pinion disposed in meshed engagement with said rack for rotating said pinion shaft, said pinion shaft being arranged for operatively engaging the valve shaft of the valve for operating the valve, means for engagement with the valve housing, and said means forming a base for mounting said device housing on the valve housing, wherein the improvement comprises that said device housing is of a modular construction comprising a center part having a first axis and a second axis extending transversely of the first axis, said pinion shaft is located within said center part and is coaxial with said first axis, said at least one poston being displaceable within said device housing in the direction of said second axis, said device housing includes a separate cylinder part for enclosing said piston, means on said center part extending around said second axis on opposite sides of said first axis for selectively securing said cylinder part onto said center part so that one said piston can be positioned on one of said opposite sides of said center part or for selectively securing one said cylinder part one each of the opposite sides of the first axis so that one said piston and cylinder part can be positioned on each of the opposite sides of said axis with said toothed rack of each said piston being engageable with said pinion shaft for combining the displacing action of said pistons in the operation of said valve, means engageable with said at least one piston within said cylinder part for biasing said piston in the direction opposite to the first direction in which said piston is actuated by the pressure medium, said means for engagement with the valve housing, said means for engagement being selected in size in accordance with the size of the valve housing, and a coupling part for connecting said pinion shaft and the valve shaft of the valve, said coupling part being selected in size in accordance with the size of the valve shaft so that said means for engagement with the valve and said coupling part are the only components of variable size required for using said actuating device with a variety of valves, a hand actuating device interconnects said pinion shaft and the valve shaft so that the valve can be operated selectively by said actuating device or by said hand actuating device, said hand device includes a first lever secured to said pinion shaft so that said first lever rotates with said pinion shaft, and a hand lever arranged to be connected to the valve shaft so that said hand lever rotates with the shaft, and means for releasably interconnecting said first lever and said hand lever, said means for releasably interconnecting said first lever and said hand lever comprises a recess formed in said first lever, and a projection secured to an elastic element, said elastic element pivotally attached to said hand lever, said projection formed to engage within the recess in said first lever so as to provide joint movement of said first lever and said second lever, said projection arranged to be disengaged from said recess for affording actuation of the valve by said hand lever.

2. An actuating device, as set forth in claim 1, wherein said center part is provided with bearing holes encircling said first axis and spaced apart along said first axis for receiving said pinion shaft and a through hole encircling said second axis and extending in the direction of said second axis for receiving said rack on said piston, and said at least one cylinder part arranged coaxially with the second axis and said through hole.

3. Valve arrangement, as set forth in claim 2, wherein one said cylinder part is located on one of the opposite sides of said center part and a housing cover is located on the opposite side of said center part for closing said through hole.

4. An actuating device, as set forth in claim 1, wherein said pinion on said pinion shaft has a number of teeth divisible by four.

5. Valve arrangement, as set forth in claim 9, wherein two said pistons are arranged in said device housing each on an opposite side of said center part and each said piston having one said toothed rack extending into said center part into meshed engagement with said pinion shaft, and said toothed racks being displaceable around the second axis for reversing the open-closed movement of the valve member.

6. An actuating device, as set forth in claim 1, including a valve position indicator located on said center part spaced in the axial direction of the first axis from the end of said pinion shaft engageable with the valve.

7. An actuating device, as set forth in claim 1, wherein a valve position indicator is located within said center part at the opposite end thereof from the valve and said indicator arranged to generate electric signals.

8. An actuating device for the remote operation of a valve, comprising a valve housing and a shaft for operating the valve, said actuating device comprising a device housing, at least one piston displaceably positioned within said device housing and being actuatable by a pressure medium for displacement in a first direction, a toothed rack connected to said piston for displacement therewith, a pinion shaft including a pinion located within said device housing and with said pinion disposed in meshed engagement with said rack for rotating said pinion shaft, said pinion shaft being arranged for operatively engaging the valve shaft of the valve for operating the valve, means for engagement with the valve housing, and said means forming a base for mounting said device housing on the valve housing, wherein the improvement comprises that said device housing is of a modular construction comprising a center part having a first axis and a second axis extending transversely of the first axis, said pinion shaft is located within said center part and is coaxial with said first axis, said at least one piston being displaceable within said device housing in the direction of said second axis, said device housing includes a separate cylinder part for enclosing said piston, means on said center part extending around said second axis on opposite sides of said first axis for selectively securing said cylinder part onto said center part so that one said piston can be positioned on one of said opposite sides of said center part or for selectively securing one said cylinder part on each of the opposite sides of said first axis so that one said piston and cylinder part can be positioned on each of the opposite sides of said first axis with said toothed rack of each said piston being engageable with said pinion shaft for combining the displacing action of said pistons in the operation of said valve, means engageable with said at least one piston within said cylinder part for biasing said piston in the direction opposite to the first direction in which said piston is actuated by the pressure medium, said means for engagement with the valve housing being variable in size in accordance with the size of the valve housing, and a coupling part for connecting said pinion shaft and the valve shaft of the valve and said coupling part being variable in size in accordance with the size of the valve shaft so that said means for engagement with the valve and said coupling are the only components of variable size required for using said actuating device with a variety of valves, said coupling part being connected to said pinion shaft by a plug connection, and said means for engagement with said valve housing comprises said base secured to said device housing and extending in the direction of the first axis toward said valve housing, clamping members extending downwardly from said base and disposed in contacting clamped engagement with said valve housing and quick releasing wedge connecting parts pressing said clamping members against said valve housing so that said actuating device can be quickly removed from said valve housing, said means for biasing said piston opposite to the first direction comprises springs acting on said piston for affording different spring characteristics acting thereon, said pistons and said racks connected thereto on opposite sides of said pinion shaft being rotatable around said second axis through 180° for reversing the rotational direction of said pinion shaft afforded by said pistons and racks, and said pinion having a number of teeth divisible by four for affording such rotational direction reversal.

* * * * *